United States Patent
Gasparini et al.

(10) Patent No.: US 9,329,649 B2
(45) Date of Patent: May 3, 2016

(54) DUAL INPUT SINGLE OUTPUT REGULATOR FOR AN INERTIAL SENSOR

(71) Applicant: STMicroelectronics S.r.l., Agrate Brianza (IT)

(72) Inventors: Alessandro Gasparini, Cusano Milanino (IT); Andrea Donadel, Meda (IT); Stefano Ramorini, Arluno (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 578 days.

(21) Appl. No.: 13/683,937

(22) Filed: Nov. 21, 2012

(65) Prior Publication Data

US 2014/0139029 A1 May 22, 2014

(51) Int. Cl.
*H02J 1/10* (2006.01)
*H02M 3/158* (2006.01)
*G06F 1/26* (2006.01)

(52) U.S. Cl.
CPC .............. *G06F 1/26* (2013.01); *Y10T 307/696* (2015.04)

(58) Field of Classification Search
CPC .......................................................... H02J 1/00
USPC ............................................................. 307/80
See application file for complete search history.

(56) References Cited

U.S. PATENT DOCUMENTS

| | | | | |
|---|---|---|---|---|
| 6,002,295 A * | 12/1999 | Gens et al. | | 327/546 |
| 6,191,500 B1 * | 2/2001 | Toy | | 307/64 |
| 6,522,190 B1 * | 2/2003 | Malik | | H02J 1/10 307/64 |
| 6,566,766 B2 * | 5/2003 | Matsuda | | H02M 1/10 307/82 |
| 6,566,935 B1 * | 5/2003 | Renous | | 327/408 |
| 7,851,947 B2 * | 12/2010 | Cassia et al. | | 307/113 |
| 2003/0193363 A1 * | 10/2003 | Egan | | 327/530 |
| 2004/0217653 A1 * | 11/2004 | Neidorff | | H02J 9/06 307/80 |
| 2006/0267739 A1 * | 11/2006 | Coloma | | H03K 19/215 340/146.2 |
| 2008/0018174 A1 * | 1/2008 | Yang | | 307/70 |
| 2008/0177436 A1 * | 7/2008 | Fortson | | G05F 23/0221 701/31.4 |
| 2009/0009004 A1 * | 1/2009 | Fujiwara | | 307/80 |
| 2009/0102289 A1 * | 4/2009 | Aipperspach et al. | | 307/80 |
| 2009/0284077 A1 * | 11/2009 | Huang | | 307/80 |
| 2010/0096930 A1 * | 4/2010 | Kuhl et al. | | 307/80 |
| 2011/0095614 A1 * | 4/2011 | Audy | | H02J 1/10 370/80 |
| 2011/0227173 A1 * | 9/2011 | Seppala | | B81C 1/0023 257/415 |
| 2011/0267145 A1 * | 11/2011 | Tseng et al. | | 330/261 |
| 2013/0032854 A1 * | 2/2013 | Lui | | 257/133 |
| 2014/0117970 A1 * | 5/2014 | Kitagaki | | 323/318 |

* cited by examiner

*Primary Examiner* — Thienvu Tran
*Assistant Examiner* — Thai Tran
(74) *Attorney, Agent, or Firm* — Seed IP Law Group PLLC

(57) ABSTRACT

A dual input single output (DISO) regulator, includes a comparator configured to receive a first and second power supply signal and to provide a first compared signal; a first switch configured to couple the first power supply source to an intermediate node, and a second switch configured to couple the second power supply source to the intermediate node; a control logic circuit, coupled to the first comparator, to the first switch, and to the second switch, and configured to receive the compared signal to control the first and the second switch in a first and second operating condition based on the compared signal. The intermediate node being biased by an intermediate power supply signal correlated to the first or second power supply signal. The DISO regulator includes a low-dropout regulator, configured to provide a regulated power supply signal based on the intermediate power supply signal.

29 Claims, 6 Drawing Sheets

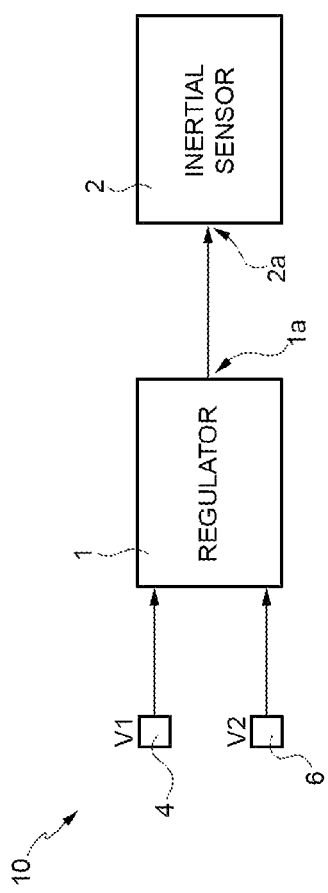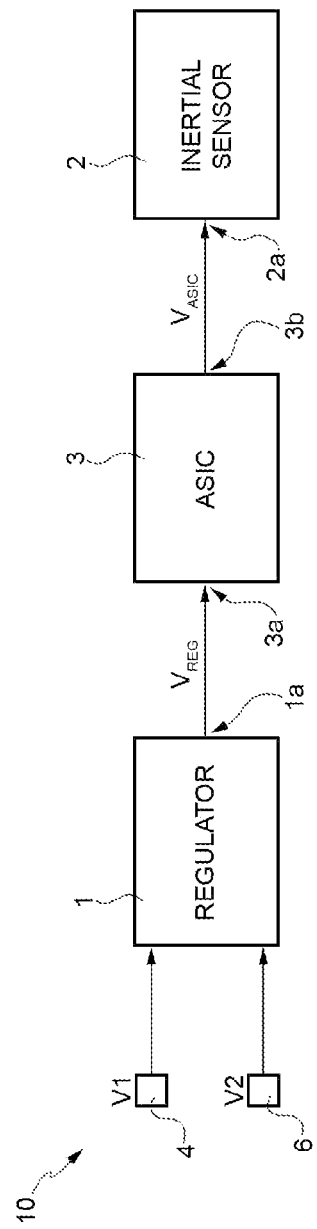

DUAL INPUT SINGLE OUTPUT REGULATOR FOR AN INERTIAL SENSOR

BACKGROUND

1. Technical Field

The present disclosure relates to a dual input single output regulator for an inertial sensor.

2. Description of the Related Art

As known, many systems are supplied by a plurality (typically two) of power sources; such systems usually use a power multiplexer to select between the various power sources.

As an example, some systems (e.g., portable devices) are able to select between a main power supply (e.g., wall adapter) and an auxiliary supply (e.g., a battery). Such a power-switching feature, to switch between the two power sources, could be implemented with a pair of diodes wired together to perform an OR logic function. The OR function provided by the diodes allows to select the highest input voltage, among the main and the auxiliary power supply, to supply the load. However, this approach has several drawbacks, such as low efficiency and relatively high heat generation. Additionally, the voltage provided at output is lower than the selected input voltage (main or auxiliary power supply) due to the voltage drop across the diodes.

BRIEF SUMMARY

The present disclosure is directed to a dual input single output regulator for an inertial sensor, in particular a gyroscope. One embodiment of a dual input single output (DISO) regulator includes a first power supply node configured to have a first power supply signal; a second power supply node configured to have a second power supply signal; and a first comparator, having first and second input terminals and an output terminal, the first and second input terminals being configured to be electrically coupled to the first and second power supply node, respectively, to receive the first and second power supply signal, respectively, and the output terminal being configured to provide a first compared signal indicative of a result of a comparison between the first and the second power supply signal.

The dual input single output regulator also includes a first switch configured to electrically couple the first power supply node to an intermediate node, the first switch having a first control terminal; a second switch configured to electrically couple the second power supply node to the intermediate node, the second switch having a second control terminal; and a control logic circuit, having a first input terminal coupled to the output terminal of the first comparator, a first output terminal coupled to the first control terminal of the first switch, and a second output terminal coupled to the second control terminal of the second switch, the control logic circuit being configured to receive the compared signal and to operate the first and second control terminals of the first and the second switches, respectively, to control the first and the second switch in a first and a second operating condition based on said compared signal, the first operating condition being configured place the first switch in a closed state and the second switch in an open state and the second operating condition being configured to put the second switch in the closed state and the first switch in the open state, and when the first or the second switch is in the closed state, the intermediate node is configured to be biased by an intermediate power supply signal correlated to the first or, respectively, the second power supply signal. In addition, the DISO regulator includes a low-dropout regulator, having an input terminal coupled to said intermediate node and configured to receive the intermediate power supply signal, and an output terminal configured to provide a regulated power supply signal based on said intermediate power supply signal.

BRIEF DESCRIPTION OF THE SEVERAL VIEWS OF THE DRAWINGS

For a better understanding of the disclosure, some embodiments thereof will now be described, purely by way of non-limiting example and with reference to the attached drawings, wherein:

FIG. 1a is a block diagram of a system comprising an inertial sensor and a dual input single output regulator for powering the inertial sensor, according to an embodiment of the present disclosure;

FIG. 1b is a block diagram of a system comprising an inertial sensor and a dual input single output regulator for powering the inertial sensor, according to a further embodiment of the present disclosure;

DETAILED DESCRIPTION

Figure 2:
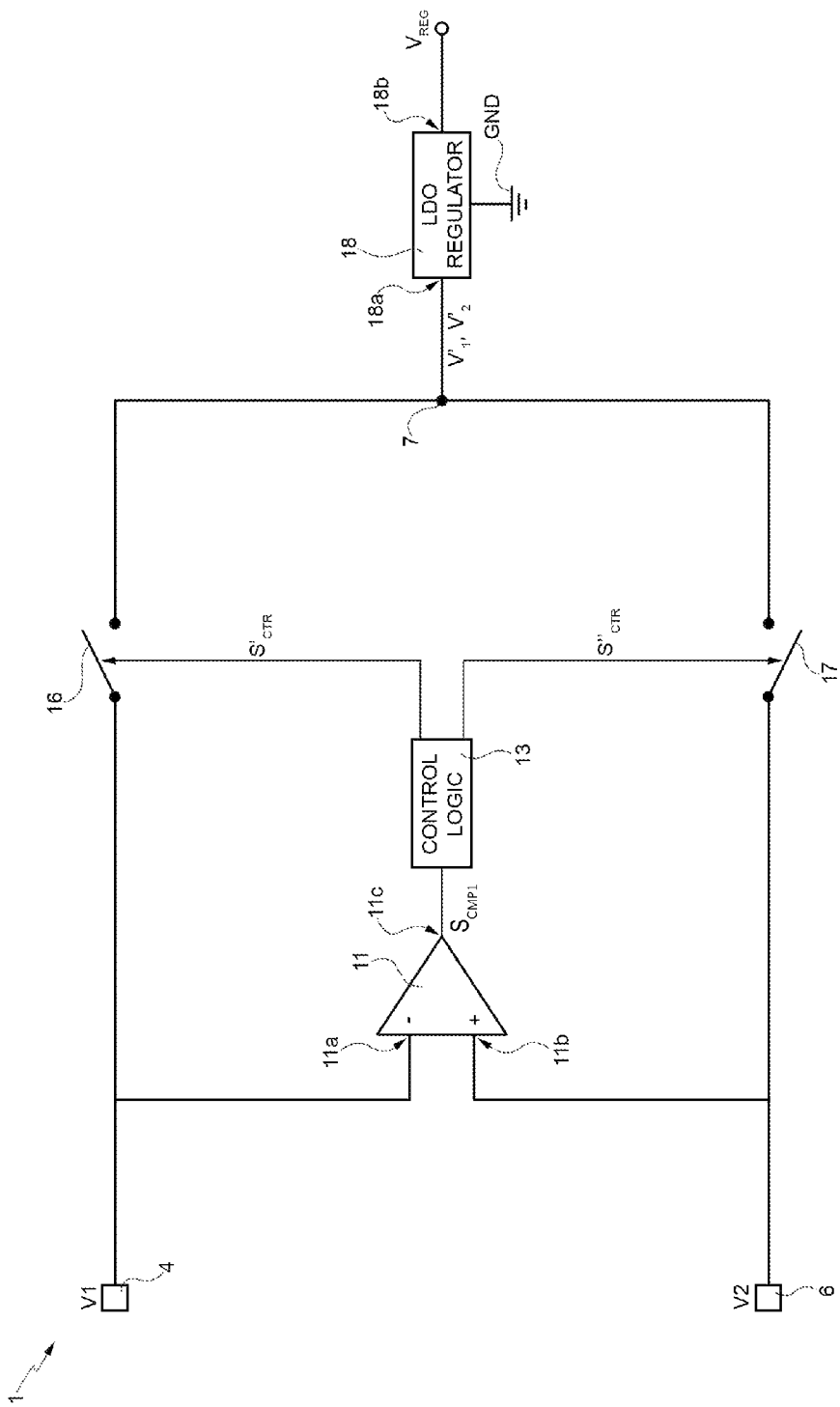
FIG. 2 shows the dual input single output regulator of FIG. 1a or FIG. 1b according to an embodiment of the present disclosure.

FIG. 1a shows a system 10, for example adapted to be used in a portable device, comprising an inertial sensor 2, in particular a gyroscope or an accelerometer, and a dual input single output (DISO) regulator 1 for powering the inertial sensor 2, according to an embodiment of the present disclosure. The DISO regulator 1 provides a stable and regulated power supply signal $V_{REG}$, starting from a plurality (in particular, two) of input power supplies nodes 4 and 6, providing respective voltages V1 and V2 which may have any value (including the null value when one of the voltages V1 or V2 is absent). Accordingly, an output pin 1a of the DISO regulator 1 is electrically coupled to an input pin 2a of the inertial sensor 2, which is a power supply input for the inertial sensor 2, for providing the regulated power supply signal $V_{REG}$ (e.g., a voltage signal) adapted to power the inertial sensor 2 during use.

According to an embodiment of the present disclosure, shown in FIG. 1b, the system 10 further comprises an ASIC circuit 3 arranged between the DISO regulator 1 and the inertial sensor 2, having an input pin 3a electrically coupled to the output pin 1a of the DISO regulator 1 for receiving the regulated power supply signal $V_{REG}$, and an output pin 3b electrically coupled to a power supply input of the inertial sensor 2, for powering the inertial sensor 2 with a power supply signal $V_{ASIC}$ which is based on the regulated power supply signal $V_{REG}$. According to an embodiment, the power supply signal $V_{ASIC}$ is a scaled version of the regulated power supply signal $V_{REG}$ to comply with dynamic input requirements of the inertial sensor 2; alternatively, according to another embodiment, the signals $V_{REG}$ and $V_{ASIC}$ are the same signal which powers both the ASIC circuit 3 and the inertial sensor 2.

The DISO regulator 1 is particularly useful when used to supply an inertial sensor 2 manufactured in MEMS technology, in particular a gyroscopic MEMS sensor. In fact, a gyroscope 2 may be supplied by different power sources according to the application which is using the gyroscope 2. In fact, some applications require the gyroscope 2 being supplied by higher or lower voltage values than other applications. Thus, with reference to FIGS. 1a and 1b, some applications may require the gyroscope 2 be supplied, through the ASIC circuit 3 or directly by the DISO regulator 1 according to the embodiment considered, by a power source $V_{REG}$ or $V_{ASIC}$ having a first voltage value based on voltage V1; instead, other applications may require the gyroscope 2 be supplied, through the ASIC circuit 3 or directly by the DISO regulator 1 according to the embodiment considered, by a power source $V_{REG}$ or $V_{ASIC}$ having a second voltage value based on voltage V2.

FIG. 2 shows an embodiment of a DISO regulator 1 according to the present disclosure. The DISO regulator 1 of FIG. 2 comprises a first comparator 11, having a first input terminal 11a (inverting input) coupled to the power supply node 4, for receiving the voltage V1, and a second input terminal 11b (non-inverting input) coupled to the power supply node 6, for receiving the voltage V2. The comparator 11 has an output terminal 11c to provide an output signal $S_{CMP\_1}$ having a value indicative of a result of the comparison between voltages V1 and V2. According to an embodiment, the output signal $S_{CMP\_1}$ is a voltage signal having two logic values $S_{CMP\_1}$="1" (high logic value) and $S_{CMP\_1}$="0" (low logic value). The high logic value of the output signal $S_{CMP\_1}$ is, for example, in the range 1.8 V-3.6 V, while the low logic value of the output signal $S_{CMP\_1}$ is, for example, in the range 0 V-0.3 V.

The high logic value may be indicative of a voltage V1 higher than, or equal to, the voltage V2, while the low logic value may be indicative of a voltage V1 lower than the voltage V2. Alternatively, the high logic value is indicative of a voltage V2 higher than, or equal to, the voltage V1, while the low logic value is indicative of a voltage V2 lower than the voltage V1. The output signal $S_{CMP\_1}$ from the first comparator 11 is provided to an input terminal of a control logic 13, shown and described with reference to FIG. 3.

The DISO regulator 1 of FIG. 2 further comprises a low-dropout (or LDO) regulator 18, which is a DC linear voltage regulator which can operate with a very small input-output differential voltage. The advantages of using a low dropout voltage regulator 18 are a lower minimum operating voltage, high operation efficiency and low heat dissipation. The LDO regulator 18 is electrically coupled to an intermediate node 7 of the DISO regulator 1. Furthermore, the DISO regulator 1 comprises a first controlled switch 16, coupled between the power supply node 4 and the intermediate node 7, and a second controlled switch 17, coupled between the power supply node 6 and the intermediate node 7. The first and second controlled switches 16, 17 are controlled, during operation of the DISO regulator 1, by respective control signals $S_{CTR}'$ and $S_{CTR}''$ generated at output by the control logic 13. As an example, when the control logic 13 senses that the voltage V1 is higher than, or equal to, the voltage V2 (i.e., output signal $S_{CMP\_1}$ has a logic value corresponding to the situation V1≥V2), the control logic 13 generates output signals $S_{CTR}'$, $S_{CTR}''$ having a respective value such that the output signals $S_{CTR}'$ controls in closed state the first controlled switch 16 (i.e., the switch 16 conducts electric current), and the output signals $S_{CTR}''$ controls in open state the second controlled switch 17 (i.e., the switch 17 does not conduct electric current). Thus, in this first operative condition, the power supply node 4 is electrically coupled to the intermediate node 7 by the switch 16 which is closed, and the power supply node 6 is electrically isolated from the intermediate node 7 by the switch 17, which is open. The LDO regulator 18 receives at an input pin 18a a power supply signal V1' which is correlated to the voltage V1 (ideally, at the intermediate node 7 there is the voltage V1, such that V1'=V1).

In a second operative condition, when the control logic 13 senses that the voltage V1 is lower than the voltage V2 (i.e., output signal $S_{CMP\_1}$ has a logic value corresponding to the situation V1<V2), the control logic 13 generates output signals $S_{CTR}'$, $S_{CTR}''$ having a respective value such that the output signals $S_{CTR}''$ controls in closed state the second controlled switch 17 (i.e., the switch 17 conducts electric current), and the output signals $S_{CTR}'$ controls in open state the first controlled switch 16 (i.e., the switch 16 does not conduct electric current). Thus, in this second operative condition, the power supply node 6 is electrically coupled to the intermediate node 7 by the switch 17 which is closed, and the power supply node 4 is electrically isolated from the intermediate node 7 by the switch 16, which is open. The LDO regulator 18 receives at the input pin 18a a power supply signal V2' which is correlated to the voltage V2 (and, ideally, at the intermediate node 7 there is the voltage V2, such that V2'=V2).

The LDO regulator 18 operates in a per se known way, and provides at an output pin 18b a stable, regulated, power supply $V_{REG}$.

Figure 3:
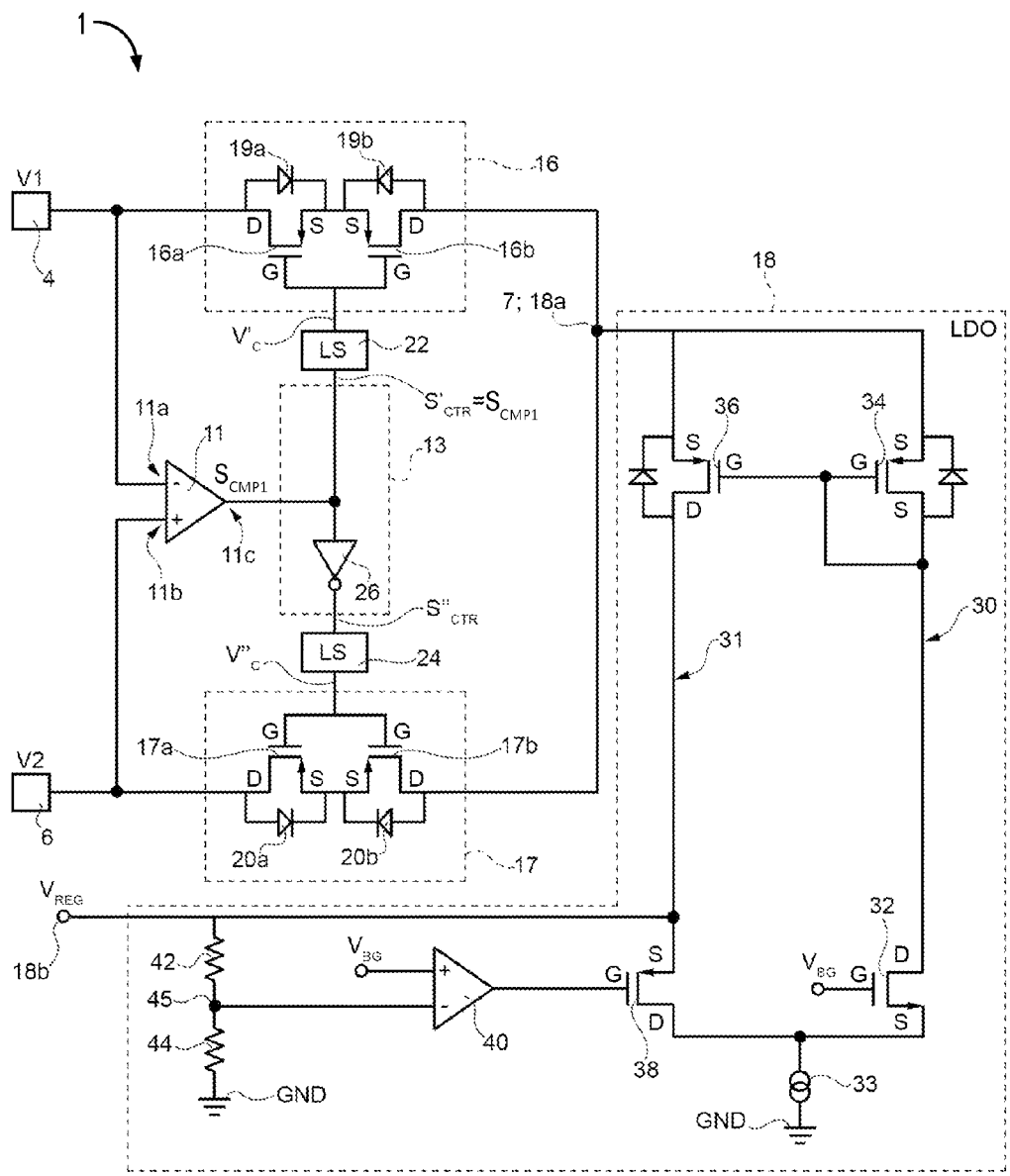
FIG. 3 shows a circuit implementation of the dual input single output regulator of FIG. 2, according to an aspect of the present disclosure.

The DISO regulator 1 of FIG. 3 effectively generates a regulated power supply signal $V_{REG}$ which is based on one of the input power signals V1, V2, and in particular on the input power signal V1 or V2 having the higher value. Thus, when only one of the power supplies V1, V2 is present at input of the DISO regulator 1 (the other one being a null signal), that power supply is provided at output of the DISO regulator 1 as a regulated power supply $V_{REG}$. Instead, when both power supplies V1, V2 are present at input of the DISO regulator 1, only the higher one is provided at output of the DISO regulator 1 as a regulated power supply $V_{REG}$. In this case, in fact, the lower power supply voltage among V1 and V2 would be of no use for the inertial sensor 2.

FIG. 3 shows a more detailed embodiment of the DISO regulator 1 of FIG. 2, according to the present disclosure. With reference to FIG. 3, the first controlled switch 16 is formed by two transistors 16a, 16b, in particular p-channel MOSFETs, connected in a "back-to-back" configuration. The transistors 16a, 16b have their source terminals S connected together, while the drain terminal D of the transistor 16a is coupled to the power supply node 4, and the drain terminal D of the transistor 16b is coupled to the intermediate node 7. The used back-to-back configuration is particularly useful to effectively isolate the power source V1 from the intermediate node 7 when the transistors 16a, 16b are turned off (i.e., switch 16 open). Connected in parallel to the transistors 16a, 16b, a respective diode 19a, 19b is shown. The diodes 19a, 19b are the built-in diodes which are present in MOSFET transistors as a consequence of the manufacturing steps.

Analogously, also the second controlled switch 17 is formed by two transistors 17a, 17b, in particular p-channel MOSFETs, connected in a "back-to-back" configuration. The transistors 17a, 17b have their source terminals S connected together, while the drain terminal D of the transistor 17a is coupled to the power supply node 6, and the drain terminal D of the transistor 17b is coupled to the intermediate node 7. The back-to-back configuration is particularly useful to effectively isolate the power source V2 from the intermediate node 7 when the transistors 17a, 17b are turned off (i.e., switch 17 open). Connected in parallel to the transistors 17a, 17b, a respective diode 20a, 20b is shown. The diodes 20a, 20b are the built-in diodes of the transistors 17a, 17b.

To control the operative state of the transistors 16a and 16b (conduction of electric current and interdiction from electric current conduction), a first level shifter 22 is coupled between the control logic 13 and the gate terminals G of the transistors 16a and 16b, for receiving the control signal $S_{CTR}'$ generated by the control logic 13 and providing a control voltage $V_C'$ having a value accepted by the gate terminals G of the transistors 16a and 16b, so as to effectively control the transistors 16a and 16b in conduction or, alternatively, interdiction state, without incurring in spurious switch-on. Analogously, a second level shifter 24 is coupled between the control logic 13 and the gate terminals G of the transistors 17a and 17b, for receiving the control signal $S_{CTR}''$ generated by the control logic 13 and providing a control voltage $V_C''$ having a value accepted by the gate terminals G of the transistors 17a and 17b, so as to effectively control the transistors 17a and 17b in conduction or, alternatively, interdiction state, without incurring in spurious switch-on. The level shifters 22 and 24 adapt the voltage value of the control signal $S_{CTR}'$ and $S_{CTR}''$ (e.g., in the range 1.8V-3.6V) to the value accepted by the gate terminals G of the transistors 16a, 16b, 17a, 17b. The level shifters 22 and 24 are of a known type, and thus they are not described in detail.

According to the embodiment of FIG. 3, the control logic 13 is formed by an inverter 26, arranged between the output terminal 11c of the first comparator 11 and the second level shifter 24, in such a way that the output signal $S_{CMP\_1}$ from the first comparator 11 is inverted before being inputted to the second level shifter 24. Instead, the first level shifter 22 is coupled to the output terminal 11c of the first comparator 11 for receiving the output signal $S_{CMP\_1}$ from the first comparator 11 (in this case, the control signal $S_{CTR}'$ corresponds to the output signal $S_{CMP\_1}$). During use it is evident that only one among the first and second switch 16, 17 is closed (thus electrically coupling one among the power supply nodes 4, 6 to the intermediate node 7) while the other one is open (electrically decoupling the other power supply nodes 6, 4 from the intermediate node 7), and vice versa.

Furthermore, FIG. 3 shows a simplified circuit diagram of an embodiment of the LDO regulator 18. The shown embodiment is only one of the possible embodiments for the LDO regulator 18, and any other LDO regulator circuits known in the art may be used in the DISO regulator 1 according to the present disclosure.

The LDO regulator 18 comprises a first branch 30 coupled between the intermediate node 7 and a reference node GND at a reference voltage (e.g., a ground terminal). The first branch 30 includes a current generator 33; a n-channel transistor 32 (e.g., MOSFET) connected in series to the current generator 33 and having a control (gate) terminal G biased at a reference voltage $V_{BG}$ (bandgap voltage in the range of 1-1.2 V) for providing a stable current flow; and a p-channel transistor 34, connected in series to the n-channel transistor 32, and having a control (gate) terminal G connected to its drain terminal D. The source terminal S of the p-channel transistor 34 is coupled to the intermediate node 7, while the drain terminal D of the p-channel transistor 34 is coupled to the drain terminal D of the n-channel transistor 32. The current generator 33 provides a current flow in the range 0.8-1.2 µA, and is coupled between the source terminal S of the n-channel transistor 32 and the reference node GND.

The LDO regulator 18 further comprises a second branch 31, coupled between the intermediate node 7 and the reference node GND. The second branch 31 includes a p-channel transistor 36, having a source terminal S coupled to the intermediate node 7 and a control (gate) terminal G coupled to the control terminal G of the p-channel transistor 34 of the first branch 30 in a current mirror configuration. The second branch 31 further includes a n-channel transistor 38 having a source terminal S coupled to the drain terminal D of the p-channel transistor 36, a drain terminal D coupled to the reference node GND and a control (gate) terminal G controlled by an operational amplifier 40. The LDO regulator 18 further comprises a voltage divider formed by resistors 42 and 44 which are connected in series between the source terminal S of the n-channel transistor 38 and reference node GND. The output node 18b of the LDO regulator 18 (providing the regulated power supply voltage $V_{REG}$) corresponds to the source terminal S of the n-channel transistor 38.

The operational amplifier 40 has a non-inverting input terminal connected to the reference voltage $V_{BG}$; furthermore, the operational amplifier 40 has an inverting input terminal connected to a node 45, which is defined between resistors 42 and 44. During operation, the voltage present at the intermediate node 7 (input to the LDO regulator 18) is passed to output node 18b under the control provided by the operational amplifier 40, thereby providing the desired regulated output voltage $V_{REG}$, which depends on the chosen values of the reference voltage $V_{BG}$ and the resistance values of the resistors 42, 44. The operation of the LDO regulator 18 is well known in literature, and thereby it is not further described herein.

Figure 4:
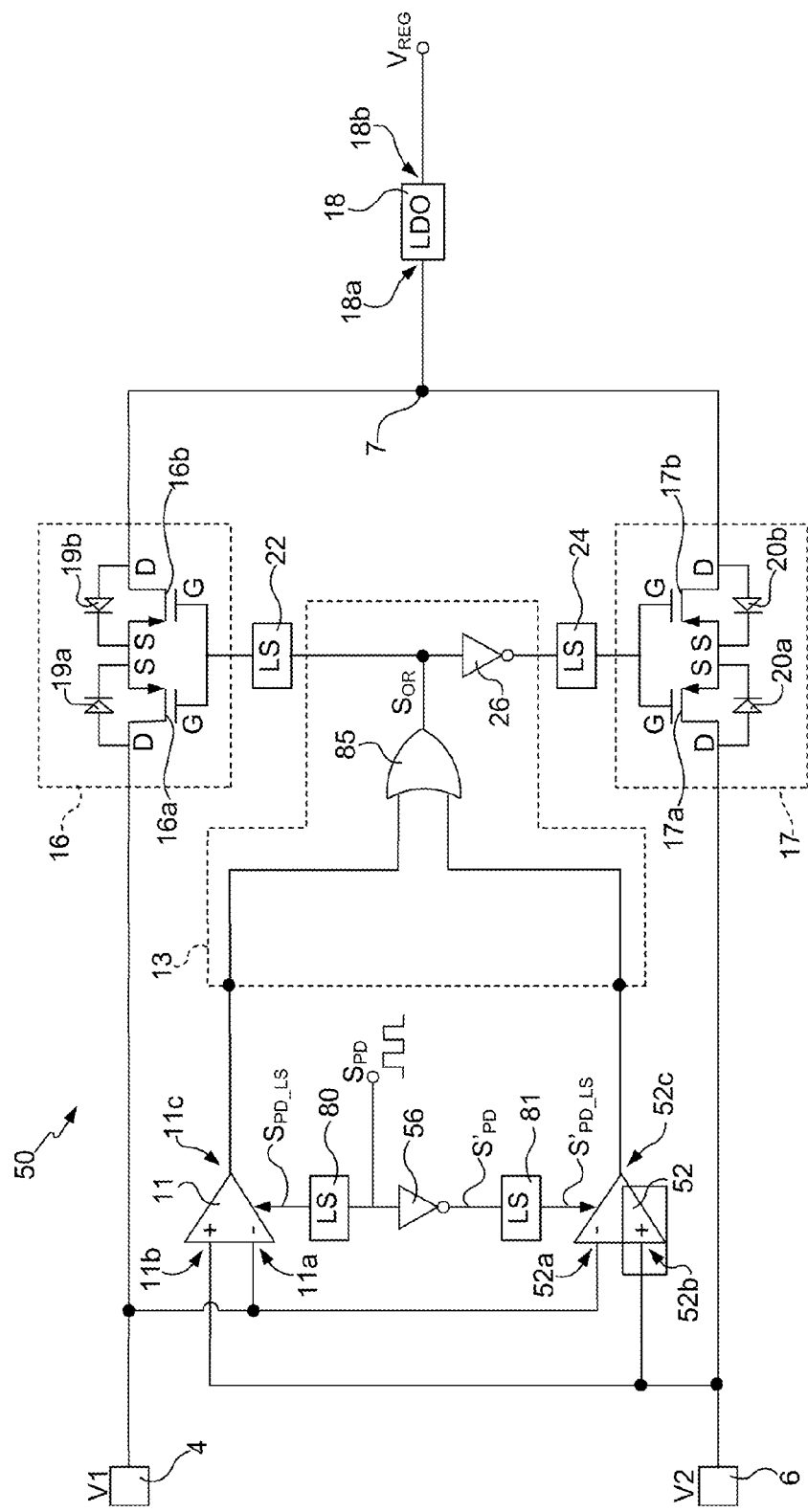
FIG. 4 shows a circuit implementation of the dual input single output regulator of FIG. 2 according to another aspect of the present disclosure.

FIG. 4 shows an embodiment of a DISO regulator 50 according to the present disclosure. Elements of the DISO regulator 50 which are analogous to elements of the DISO regulator 1 of FIGS. 1-3 are indicated with same reference numbers and not further described.

The DISO regulator 50 comprises a second comparator 52 having a first input terminal 52a (inverting input) coupled to the power supply node 4, for receiving the power supply voltage V1, and a second input terminal 52b (non-inverting input) coupled to the power supply node 6, for receiving the power supply voltage V2. The second comparator 52 has an output terminal 52c providing an output signal $S_{CMP\_2}$ having a value indicative of a result of the comparison between voltages V1 and V2. According to an embodiment, the output signal $S_{CMP\_2}$ is a voltage signal having two logic values, namely $S_{CMP\_2}$="1" (high logic value) and $S_{CMP\_2}$="0" (low logic value). The high logic value may be indicative of a voltage V1 higher than, or equal to, the voltage V2, while the low logic value is indicative of a voltage V1 lower than the voltage V2. Alternatively, the high logic value is indicative of a voltage V2 higher than, or equal to, the voltage V1, while the low logic value is indicative of a voltage V2 lower than the voltage V1.

The output signals $S_{CMP\_1}$ and $S_{CMP\_2}$ from the first and, respectively, second comparator 11, 52 are provided to respective input terminals of the control logic 13.

In the embodiment of FIG. 4, the first comparator 11 is configured to provide fast operation performances, at the price of high power consumption; instead, the second comparator 52 is configured to operate at lower speed guarantying power saving.

For example, the first comparator 11 is a comparator with precise and temperature-independent hysteresis, and second comparator is a comparator without hysteresis.

The use of the first and second comparators 11 and 52 may be advantageous when the DISO regulator 50 is coupled to a system (e.g., to the inertial sensor 2 of FIG. 1a or 1b) that is configured to operate in two modalities, i.e., a low power mode (wherein power consumption is reduced, as well as performance desires) and a high power mode (wherein power consumption is high, as well as the desired performances). Accordingly, since during the low power mode of operation it is supposed that power saving is prioritized over performances, only the second comparator 52 will operate during the low power mode of such a system and the first comparator 11 is forced in a power down state (or low consumption state); instead, during high power mode of operation of such a system, only the first comparator 11 is used, and the second comparator 52 is forced in a power down state (or low consumption state). To control alternatively the first and second comparator 11, 52 in power down state, the first and the second comparators 11, 52 receive each a power down control signal $S_{PD}$ and $S_{PD}'$, where $S_{PD}'$ is obtained by passing the power down control signal $S_{PD}$ through an inverter 56. The power down control signals $S_{PD}$ and $S_{PD}'$ are, for example, square-wave signals. The power down control signals $S_{PD}$ and $S_{PD}'$ are each configured to decouple the input terminals 11a, 11b of first comparator 11 and, respectively, input terminals 52a, 52b of second comparator 52 from the respective output terminal 11c and 52c, and forcing a predefined output signal at the output terminals 11c and 52c. The forced signal is, for example, the low logic value "0". As said, only one among the first and second comparator 11, 52 is controlled in power down state at a considered time instant (i.e., during use, the two comparators 11, 52 are not controlled in power down state at the same time).

Figure 5A:
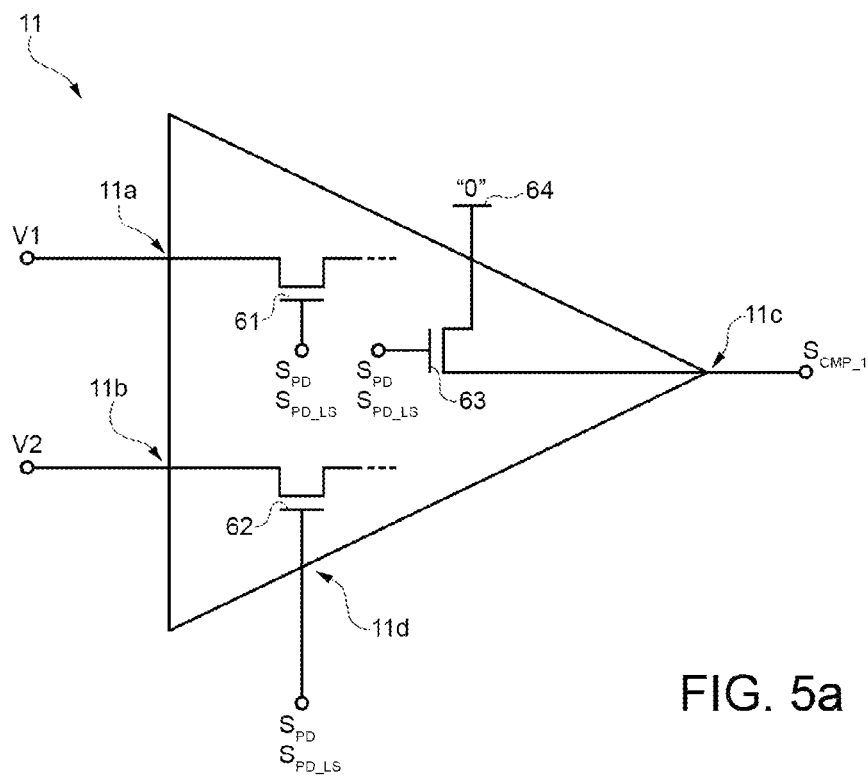
FIGS. 5a and 5b show embodiments of comparators of the dual input single output regulator of FIG. 4.

According to an embodiment, as shown in FIG. 5a, the first comparator 11 includes a first and a second input switches 61, 62 (e.g., MOSFET transistors) coupled respectively at the first and second input terminal 11a, 11b and having a control terminal 11d receiving the power down control signal $S_{PD}$. The first and a second input switches 61, 62 are configured in such a way that, when the power down control signal $S_{PD}$ has a first value (e.g., low logic value "0"), they are controlled in open state (e.g., they are n-channel MOSFETs), electrically decoupling the output terminal 11c from both input terminals 11a, 11b; moreover, the first comparator 11 includes an output switch 63 coupling the output terminal 11c to a predefined power source 64 for providing the aforementioned predefined output signal (e.g., the low logic value "0") at the output terminal 11c. The output switch 63 is, e.g., a MOSFET transistor, and has a control terminal (gate) controlled by the power down control signal $S_{PD}$ in such a way that, when the power down control signal $S_{PD}$ opens the first and a second input switches 61, 62, the same power down control signal $S_{PD}$ closes the output switch 63 (e.g., output switch 63 is a p-channel MOSFET). When the output switch 63 is closed, it electrically couples the predefined power source 64 with the output terminal 11c thus effectively providing the predefined output signal (e.g., the low logic value "0") to the output terminal 11c. The signal $S_{CMP\_1}$ is in this way forced at a predefined logic value (e.g., the low logic value "0"). Instead, when the power down control signal $S_{PD}$ has a second value (e.g., high logic value "1"), the first and second switch 61, 62 are controlled in closed state, and the output switch 63 in open state, and the first comparator 11 operates in its normal mode of operation.

It is evident that the switches 61, 62 and 63 may be controlled switch of any type, for example IGBTs, and/or they may include further transistors in back-to-back configuration. Moreover, n-channel transistors may be substituted by p-channel transistors, and vice versa.

Figure 5B:
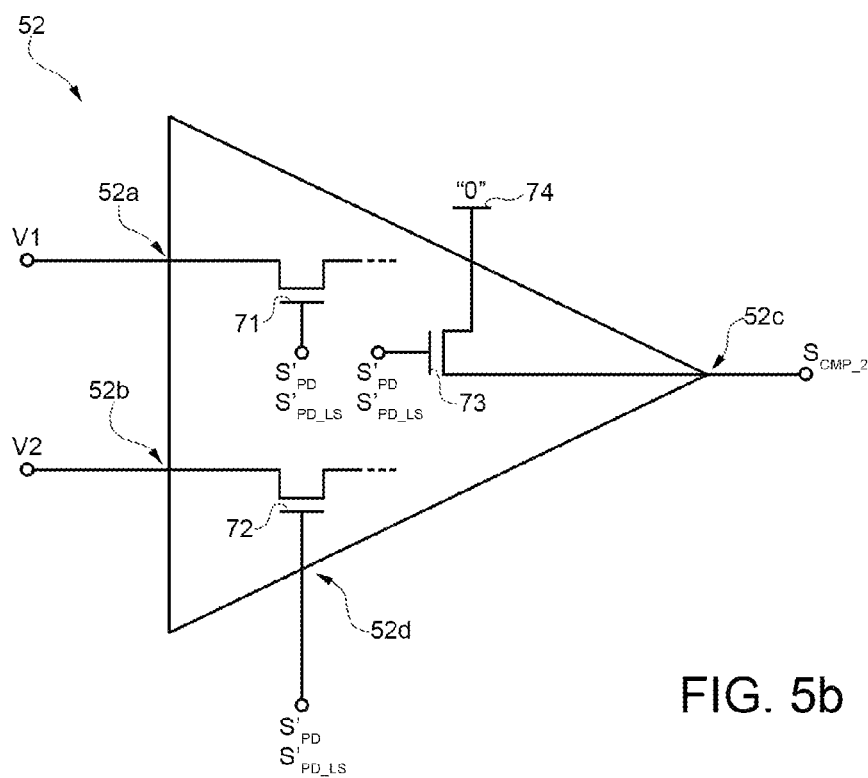

As shown in FIG. 5b, the second comparator 52 is analogous to the first comparator 11 of FIG. 5a. According to this embodiment, the second comparator 52 includes an own first and a second input switch 71, 72 (e.g., MOSFET transistors) coupled respectively to the first and second input terminal 52a, 52b and having a control terminal 52d receiving the power down control signal $S_{PD}'$. The first and a second input switches 71, 72 are configured in such a way that, when the power down control signal $S_{PD}'$ has the first value (e.g., low logic value), they are controlled in open state, electrically decoupling the output terminal 52c from both input terminals 52a, 52b; moreover, the second comparator 52 includes an output switch 73 coupling the output terminal 52c to a predefined power source 74 for providing the aforementioned predefined output signal (e.g., the low logic value "0") at the output terminal 52c. The output switch 73 is, e.g., a MOSFET transistor, and has a control terminal (gate) controlled by the power down control signal $S_{PD}'$ in such a way that, when the power down control signal $S_{PD}'$ opens the first and a second input switches 71, 72, it also closes the output switch 73, electrically coupling the predefined power source 74 with the output terminal 52c. Thus, the predefined output signal (e.g., the low logic value "0") is effectively provided to the output terminal 52c. The signal $S_{CMP\_2}$ is in this way forced at a predefined logic value (e.g., the low logic value "0").

Analogously to what described with reference to FIG. 5a, when the power down control signal $S_{PD}'$ has the second value (e.g., high logic value "1"), the first and second switch 71, 72 are controlled in closed state, and the output switch 73 in open state, and the second comparator 52 operates in its normal mode of operation.

As already said, when the power down control signal $S_{PD}$ has the first value, the power down control signal $S_{PD}'$ has the second value, and vice versa, thus allowing only one among the first and second comparator 11, 52 to operate in normal mode of operation at a time. The other comparator 11, 52 will have its output forced at the predefined output signal (in the example described, the logic value "0").

With reference to FIGS. 4, 5a and 5b, the first and respectively second comparator power down control signals $S_{PD}$ and $S_{PD}'$ may be shifted to respective voltage levels accepted at input by the control terminals of the specific transistors 61, 62, 63 and 71, 72, 73 used. To this end, a respective level shifter 80, 81 receives the respective power down control signals $S_{PD}$ and $S_{PD}'$ and generates a respective output signals $S_{PD\_LS}$ and $S_{PD\_LS}'$ adapted to control the control terminals of the transistors 61, 62, 63 and, respectively, transistors 71, 72, 73. The specific values of output signals $S_{PD\_LS}$ and $S_{PD\_LS}'$ depends of the type of transistors 61, 62, 63 and 71, 72, 73, and they are chosen accordingly. It is evident that, in case the voltage levels of the power down control signals $S_{PD}$ and $S_{PD}'$ does not need to be shifted and have values adapted to control the transistors 61, 62, 63 and 71, 72, 73, the level shifters 80, 81 are not required.

With reference to FIG. 4 only, the control logic 13 comprises an OR logic device 85 having two inputs and one output. One input of the OR logic device 85 is coupled to the output terminal 11c of the comparator 11, for receiving the signal $S_{CMP\_1}$, while the other input of the OR logic device 85 is coupled to the output terminal 52c of the comparator 52, for receiving the signal $S_{CMP\_2}$. The output of the OR logic device 85 is calculated according to the known OR logic, i.e., the output signal $S_{OR}$ is the high logic signal "1" when at least one among the received inputs is the high logic signal "1", instead it is the low logic signal "0". In this way, since the output signal $S_{CMP\_1}/S_{CMP\_2}$ is the low logic value "0" when the respective comparator 11, 52 is in power down state, it is the other output signal $S_{CMP\_2}/S_{CMP\_2}$ which controls the output signal $S_{OR}$ of the OR logic device 85.

The control logic 13 further comprises, analogously to what already described with reference to FIG. 3, the inverter 26. However, according to FIG. 4, the inverter 26 is coupled between the output terminal of the OR logic device 85 and the control terminal(s) of the switch 17. The control terminal(s) of the switch 16 receives the output signal $S_{OR}$ provided by the OR logic device 85, while the control terminal(s) of the switch 17 receives an inverted $S_{OR}$ signal, namely the signal $S_{OR}'$.

The signals $S_{OR}$ and $S_{OR}'$ of FIG. 4 are analogous, for what concern voltage levels, to the control signals $S_{CTR}'$ and $S_{CTR}''$ of FIG. 3. Accordingly, the DISO regulator 50 of FIG. 4 may further comprise first and second level shifters 22 and 24 configured to receive the signals $S_{OR}$ and $S_{OR}'$ outputted by the OR logic device 85 and adapt their voltage levels to corresponding voltage levels accepted at input by the switches 16 and 17.

Figure 6:
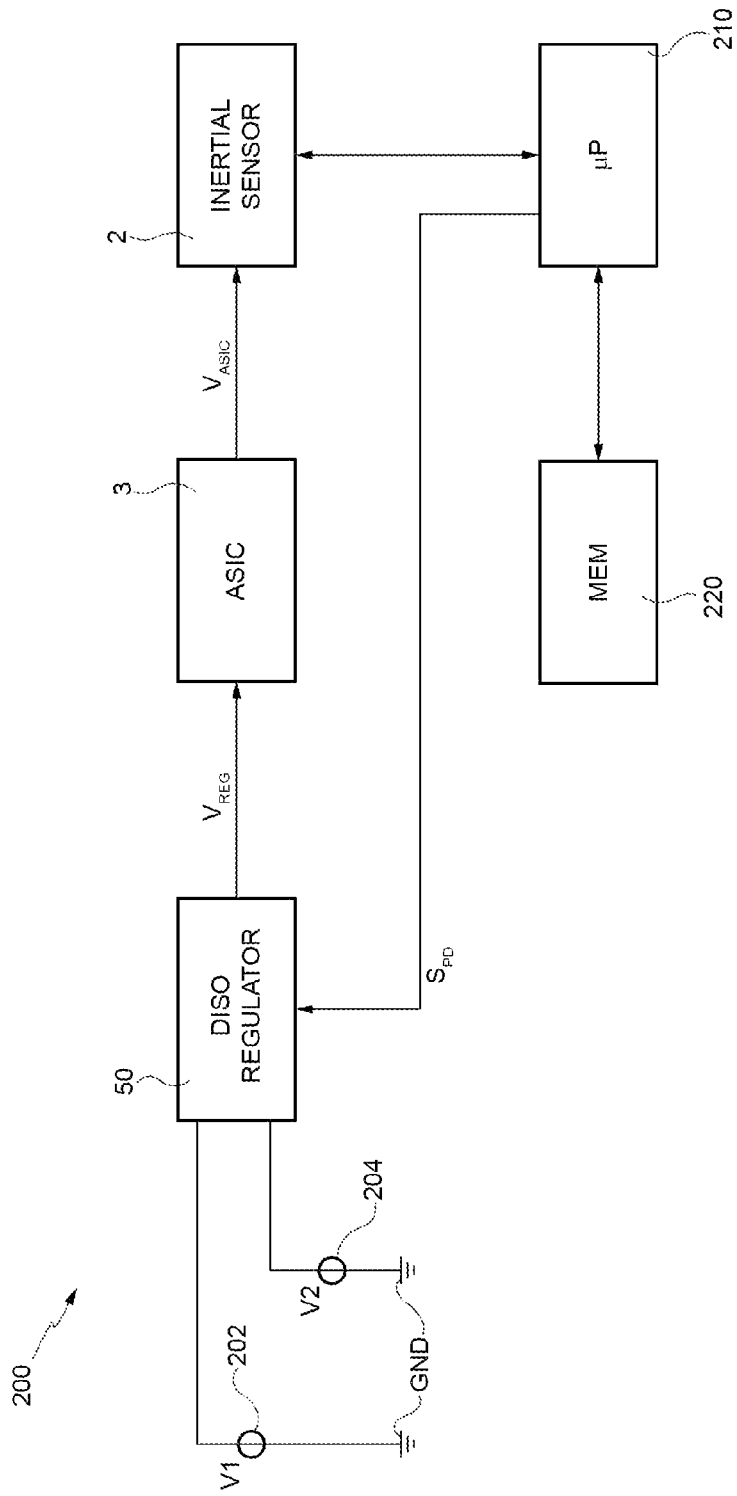
FIG. 6 is a block diagram of a portable device which includes the dual input single output regulator of FIG. 4.

FIG. 6 shows schematically a portable device 200 comprising: a DISO regulator 50 according to respective embodiments of present disclosure; an ASIC circuit 3 electrically coupled to the output 18b of the DISO regulator 50 to receive the regulated power supply signal $V_{REG}$; and an inertial sensor 2, in particular a gyroscope, electrically coupled to the ASIC circuit 3 to receive the power supply signal $V_{ASIC}$ which is based on the regulated power supply signal $V_{REG}$. According to an embodiment, the power supply signal $V_{ASIC}$ is the same as the regulated power supply signal $V_{REG}$. According to another embodiment, the power supply signal $V_{ASIC}$ is scaled with respect to the regulated power supply signal $V_{REG}$. According to still another embodiment, the power supply signal $V_{ASIC}$ is increased with respect to the regulated power supply signal $V_{REG}$.

The portable device 200 further comprises a first power supply generator 202 providing the power supply signal V1 to the DISO regulator 50, and a second power supply generator 204 providing the power supply signal V2 to the DISO regulator 50.

The portable device 200 further comprises a microcontroller 210, operatively coupled to the inertial sensor 2 in a per se known way, to use the capabilities of the inertial sensor 2. The microcontroller 210 is operatively coupled to a memory 220, storing one or more software programs. When a software program is executed by the microprocessor 210, performance requirements required by such software program are used by the microprocessor to control the generation of the power down signal $S_{PD}$. Accordingly, when low performance/low consumption characteristics are required, the power down signal $S_{PD}$ has the first value indicative of such a condition (e.g., low logic value "0"); alternatively, when high performance characteristics are required (irrespective of the power consumption), the power down signal $S_{PD}$ has another value indicative of such a different condition (e.g., high logic value "1").

Finally, it is evident that modifications and variations may be made to the resonant microelectromechanical system described herein, without thereby departing from the scope of the present disclosure.

For instance, the control logic 13 may be implemented by a microcontroller or microprocessor (not shown), implementing the operation described with reference to the control logic 13 (i.e., control of the state of switches 16 and 17 based on the received compared signals from the comparator 11 (embodiment of FIG. 3) or from the comparators 11 and 52 (embodiment of FIG. 4).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A dual input single output regulator, comprising:
    a first power supply node configured to have a first power supply signal;
    a second power supply node configured to have a second power supply signal;
    a first comparator, having first and second input terminals and an output terminal, the first and second input terminals being configured to be electrically coupled to the first and second power supply nodes, respectively, to receive the first and second power supply signals, respectively, and the output terminal being configured to provide a first compared signal indicative of a result of a comparison between the first and second power supply signals, the first comparator being configured to be controlled by an external control signal, to force the first compared signal to a predefined logic value;
    a first switch configured to electrically couple the first power supply node to an intermediate node, the first switch having a first control terminal;
    a second switch configured to electrically couple the second power supply node to the intermediate node, the second switch having a second control terminal;
    a second comparator, having first and second input terminals and an output terminal, the first and second input terminals being configured to be electrically coupled to the first and second power supply nodes, respectively, to receive the first and second power supply signal, respectively, and the output terminal being configured to provide a second compared signal indicative of a result of a comparison between the first and the second power supply signal, the second comparator being configured to be controlled by the external control signal to force the second compared signal to the predefined logic value; and
    a control logic circuit, having a first input terminal coupled to the output terminal of the first comparator, a second input terminal coupled to the output terminal of the second comparator, a first output terminal coupled to the first control terminal of the first switch, and a second output terminal coupled to the second control terminal of the second switch, the control logic circuit being configured to receive the first compared signal and to operate the first and second control terminals of the first and the second switches, respectively, to control the first and second switch in first and second operating conditions, respectively, based on the first or second compared signal, wherein:
        the control logic circuit is configured to place, during the first operating condition, the first switch in a closed state and the second switch in an open state and, during the second operating condition, to place the second switch in the closed state and the first switch in the open state, the first switch is configured, when in the closed state, to bias the intermediate node with a first intermediate power supply signal correlated to the first power supply signal, and the second switch is configured, when in the closed state, to bias the intermediate node with a second intermediate power supply signal correlated to the second power supply signal; and a low-dropout regulator having an input terminal coupled to said intermediate node and configured to receive the intermediate power supply signals, and an output terminal configured to provide a regulated power supply signal based on said intermediate power supply signals.

2. The dual input single output regulator according to claim 1, wherein the first switch is formed by first and second transistors connected in series to one another in a back-to-back configuration, said first control terminal of the first switch being formed by gate terminals of the first and second transistors; and the second switch is formed by third and fourth transistors connected in series to one another in a back-to-back configuration, said second control terminal of the second switch being formed by gate terminals of the third and fourth transistors.

3. The dual input single output regulator according to claim 1, wherein the first compared signal generated by the first comparator is a logic signal having a first value and a second value, the first value of the first compared signal being indicative of the first power supply signal being higher than, or equal to, the second power supply signal, and the second value of the first compared signal being indicative of the first power supply signal being lower than the second power supply signal.

4. The dual input single output regulator according to claim 3, wherein the control logic circuit includes an inverter circuit configured to couple the output terminal of the first comparator to the second output terminal of the control logic circuit and configured to generate an inverted signal, the first output terminal of the control logic circuit being coupled to the output terminal of the first comparator in such a way that the signal present at the first output of the control logic circuit has a logic value opposite to a logic value of the inverted signal present at the second output of the control logic circuit.

5. The dual input single output regulator according to claim 3, further comprising a first level shifter configured to couple the first output terminal of the control logic circuit to the first control terminal of the first switch, configured to receive the first compared signal generated by the first comparator and to bias the control terminal of the first switch with a first shifted signal which is a logic signal having a first value and a second value scaled with respect to the first value and second value, respectively, of the first compared signal.

6. The dual input single output regulator according to claim 4, further comprising a second level shifter configured to couple the inverter circuit to the second control terminal of the second switch, configured to receive the inverted signal generated by the inverter circuit and to bias the second control terminal of the second switch with a second shifted signal which is a logic signal having a first value and a second value scaled with respect to the first value and second value, respectively, of the inverted signal.

7. The dual input single output regulator according to claim 1, wherein:
the control logic circuit is configured to:
receive the predefined logic value at the first input terminal, and
receive the second compared signal at the second input terminal.

8. The dual input single output regulator according to claim 1, wherein the control logic circuit comprises an OR logic device having a first input terminal coupled to the first input terminal of the control logic circuit, a second input terminal coupled to the second input terminal of the control logic circuit, and an output terminal, configured to generate a logic OR signal, and
wherein the predefined value is a "0" logic value so that the logic OR signal corresponds to the received first or second compared signal.

9. The dual input single output regulator according to claim 8, wherein the control logic circuit includes an inverter circuit configured to couple the output terminal of the OR logic device to the second control terminal of the second switch, the inverter circuit being configured to receive the logic OR signal having a first logic value and generate and inverted signal having a second logic value opposite to the first logic value.

10. The dual input single output regulator according to claim 1, wherein the first comparator is a high performance, high consumption comparator and the second comparator is a low performance, low consumption comparator.

11. The dual input single output regulator according to claim 1 wherein the first comparator is a low performance, low consumption comparator, and the second comparator is a high performance, high consumption comparator.

12. The dual input single output regulator according to claim 1, wherein the first comparator comprises:
a first input switch configured to couple the first input terminal of the first comparator to the output terminal of the first comparator;
a second input switch configured to couple the second input terminal of the first comparator to the output terminal of the first comparator; and
a first output switch configured to couple the output terminal of the first comparator to a first predefined node configured to provide said predefined logic value;
the first input switch, second input switch and first output switch of the first comparator being configured to be controlled by said external power down signal to control the first and second input switch to be in the open state, to electrically isolate the first and the second input terminal from the output terminal of the first comparator, and to control the first output switch to be in the closed state to electrically couple the first predefined node with the output of the first comparator to force the first compared signal to have the predefined logic value.

13. The dual input single output regulator according to claim 1, wherein the second comparator comprises:
a third input switch configured to couple the first input terminal of the second comparator to the output terminal of the second comparator;
a fourth input switch configured to couple the second input terminal of the second comparator to the output terminal of the second comparator; and
a second output switch configured to couple the output terminal of the second comparator to a second predefined node configured to have said predefined logic value;
the third input switch, fourth input switch and second output switch of the second comparator being configured to be controlled by said external power down signal to control the third and fourth input switch to be in the open state, to electrically isolate the first and the second input terminal from the output terminal of the second comparator, and to control the second output switch to be in the closed state to electrically couple the second predefined node with the output of the second comparator to force the second compared signal to have the predefined logic value.

14. A portable device, comprising:
an inertial sensor having an input power supply pin;
a first power source configured to generate a first power supply signal;
a second power source configured to generate a second power supply signal; and
a dual input single output regulator, including:
  a first comparator, having first and second input terminals and an output terminal, the first and second input terminals being configured to be electrically coupled to the first and second power supply source, respectively, to receive the first and second power supply signal, and the output terminal being configured to provide a first compared signal indicative of a result of a comparison between the first and the second power supply signal, the first comparator being configured to be controlled by an external power down signal to force the first compared signal to have a predefined logic value;
  an intermediate node;
  a first switch configured to electrically couple the first power supply source to the intermediate node, the first switch having a first control terminal;
  a second switch configured to electrically couple the second power supply source to the intermediate node, the second switch having a second control terminal;
  a second comparator, having first and second input terminals and an output terminal, the first and second input terminals being configured to be electrically coupled to the first and second power supply source, respectively, to receive the first and second power supply signal, respectively, and the output terminal being configured to provide a second compared signal indicative of a result of a comparison between the first and the second power supply signal, the second comparator being configured to be controlled by the external power down signal to force the second compared signal to have the predefined logic value;
  a control logic circuit, having a first input terminal coupled to the output terminal of the first comparator, a second input terminal coupled to the output terminal of the second comparator, a first output terminal coupled to the control terminal of the first switch, and a second output terminal coupled to the control terminal of the second switch, the control logic circuit being configured to receive the first compared signal and to operate the control terminals of the first and the second switch to control the first and the second switch in first and second operating conditions, respectively, based on the first or second compared signal, wherein:
    the control logic is configured to place during the first operating condition, the first switch in a closed state and the second switch in an open state, and during the second operating condition configured to place the second switch in the closed state and the first switch in the open state, and
    the first switch is configured, when in the closed state, to bias the intermediate node with a first intermediate power supply signal correlated to the first power supply signal, and
    the second switch is configured, when in the closed state, to bias the intermediate node with a second intermediate power supply signal correlated to the second power supply signal; and
  a low-dropout regulator, having an input terminal coupled to said intermediate node to receive the intermediate power supply signal, and an output terminal configured to provide a regulated power supply signal based on said intermediate power supply signal,
    the output terminal of the low-dropout regulator being electrically coupled to the input power supply pin of the inertial sensor to supply the inertial sensor with a regulated voltage.

15. The portable device according to claim 14, further comprising an ASIC circuit having an input pin electrically coupled to the output terminal of said low-dropout regulator to receive the regulated power supply signal, and an output pin electrically coupled to the input power supply pin of the inertial sensor, to supply the ASIC circuit with regulated power supply signal and the inertial sensor is configured to receive said regulated power supply signal through the ASIC circuit.

16. The portable device according to claim 14, wherein said closed state is an electric current conduction state for the first or second switch, and said open state is an electric isolation state for the first or second switch.

17. The portable device according to claim 14, wherein the first switch is formed by first and second transistors connected in series to one another in a back-to-back configuration, said first control terminal of the first switch being formed by gate terminals of the first and a second transistors; and the second switch is formed by third and fourth transistors connected in series to one another in a back-to-back configuration, said second control terminal of the second switch being formed by gate terminals of the third and fourth transistors.

18. The portable device according to claim 14, wherein the first compared signal generated by the first comparator is a logic signal having a first value and a second value, the first value of the first compared signal being indicative of a first power supply signal that is higher than, or equal to, the second power supply signal, and the second value of the first compared signal being indicative of a first power supply signal that is lower than the second power supply signal.

19. The portable device according to claim 18, wherein the control logic circuit includes an inverter circuit configured to couple the output terminal of the first comparator to the second output terminal of the control logic circuit and configured to generate an inverted signal, the first output terminal of the control logic circuit being coupled to the output terminal of the first comparator to generate at the first output of the control logic circuit a signal that has a logic value opposite to the logic value of the inverted signal present at the second output of the control logic circuit.

20. The portable device according to claim 18, wherein the dual input single output regulator further comprises a first level shifter configured to couple the first output terminal of the control logic circuit to the first control terminal of the first switch, and is configured to receive the first compared signal generated by the first comparator, and is configured to bias the first control terminal of the first switch with a first shifted signal which is a logic signal having a first value and a second value scaled with respect to the respective first value and second value of the first compared signal.

21. The portable device according to claim 19, wherein the dual input single output regulator further comprises a second level shifter configured to couple the inverter circuit to the second control terminal of the second switch, is configured to receive the inverted signal generated by the inverter circuit, and is configured to bias the second control terminal of the second switch with a second shifted signal which is a logic signal having a first value and a second value scaled with respect to the respective first value and second value of the inverted signal.

22. The portable device according to claim 14, wherein the control logic circuit is configured to:
receive the predefined logic value at the first input terminal, and
receive the second compared signal at the second input terminal.

23. The portable device according to claim 14, wherein the control logic circuit comprises an OR logic device having a first input terminal coupled to the first input terminal of the control logic circuit, a second input terminal coupled to the second input terminal of the control logic circuit, and an output terminal configured to generate a logic OR signal,
wherein the predefined value is a "0" logic value so that the logic OR signal corresponds to the received first or second compared signal.

24. The dual input single output regulator according to claim 23, wherein the control logic circuit includes an inverter circuit configured to couple the output terminal of the OR logic device to the control terminal of the second switch, the inverter circuit being configured to receive the logic OR signal having a first logic value and generate and inverted signal having a second logic value opposite to the first logic value.

25. The portable device according to claim 14, wherein the first comparator a high performance, high consumption comparator and the second comparator is a low performance, low consumption comparator.

26. The portable device according to claim 14, wherein the first comparator is a low performance, low consumption comparator and the second comparator is a high performance, high consumption comparator.

27. The portable device according to claim 14, wherein the first comparator comprises:
a first input switch configured to couple the first input terminal of the first comparator to the output terminal of the first comparator;
a second input switch configured to couple the second input terminal of the first comparator to the output terminal of the first comparator; and
a first output switch configured to couple the output terminal of the first comparator to a first predefined node configured to provide said predefined logic value;
the first input switch, second input switch and first output switch of the first comparator being configured to be controlled by said external power down signal to control the first and the second input switch to be in the open state, to electrically isolating the first and the second input terminal from the output terminal of the first comparator, and to control the first output switch to be in the closed state to electrically couple the first predefined node with the output of the first comparator to force the first compared signal to have the predefined logic value.

28. The portable device according to claim 14, wherein the second comparator comprises:
a third input switch configured to couple the first input terminal of the second comparator to the output terminal of the second comparator;
a fourth input switch configured to couple the second input terminal of the second comparator to the output terminal of the second comparator; and
a second switch configured to couple the output terminal of the second comparator to a second predefined node configured to provide said predefined logic value;
the third input switch, fourth input switch and second output switch of the second comparator being configured to be controlled by said external power down signal to control the third and the fourth input switch to be in the open state, to electrically isolate the first and the second input terminal from the output terminal of the second comparator, and to control the second output switch to be in the closed state to electrically couple the second predefined node with the output of the second comparator to force the second compared signal to have the predefined logic value.

29. The portable device according to claim 14, further comprising a microcontroller configured to execute software instructions to generate said external power down signal to provide the external power down signal with a first logic value, and, to provide the external power down signal with a second logic value, the second logic value being different from the first logic value.

* * * * *